(12) United States Patent  
Gordon et al.

(10) Patent No.: US 7,354,280 B2  
(45) Date of Patent: Apr. 8, 2008

(54) MODULAR POWER DISTRIBUTION SYSTEM

(75) Inventors: David Scott Gordon, Hillsboro, ND (US); Michael Ray Schlichtmann, Fargo, ND (US); Jon Thomas Jacobson, Fargo, ND (US)

(73) Assignee: Deere & Company, Moline, IL (US)

( * ) Notice: Subject to any disclaimer, the term of this patent is extended or adjusted under 35 U.S.C. 154(b) by 22 days.

(21) Appl. No.: 11/501,093

(22) Filed: Aug. 8, 2006

(65) Prior Publication Data

US 2008/0038942 A1 Feb. 14, 2008

(51) Int. Cl.  
*H01R 12/00* (2006.01)

(52) U.S. Cl. ..................... 439/76.2; 439/638
(58) Field of Classification Search ............... 439/76.1, 439/76.2, 638  
See application file for complete search history.

(56) References Cited

U.S. PATENT DOCUMENTS

| | | | | |
|---|---|---|---|---|
| 5,617,299 A | * | 4/1997 | Knoop et al. | 361/788 |
| 5,748,451 A | * | 5/1998 | Thompson et al. | 361/788 |
| 5,857,054 A | * | 1/1999 | Thomas et al. | 385/134 |

| | | | | |
|---|---|---|---|---|
| 2007/0202717 A1 | * | 8/2007 | Vera et al. | 439/76.2 |

FOREIGN PATENT DOCUMENTS

WO 98/33681 8/1998

OTHER PUBLICATIONS

Yazaki Web page www.yazaki.com.  
AFL Automotive web page- www.alcoa.com.  
European Search Report dated Dec. 27, 2007 (Dec. 27, 2007).

* cited by examiner

*Primary Examiner*—James Harvey

(57) ABSTRACT

A vehicle having a power and information system including a vehicle structural member, an insulated power conductor, a communication link and a modular distribution system. The modular distribution system is attached to the vehicle structural member. The modular distribution system is coupled with the power conductor and with the communication link. The modular distribution system includes a backbone module having an electrical power connection and at least one plug pack. Each plug pack includes a first connector, a second connector and a controller pack. The first connector is connectable to the backbone module. The second connector has a plurality of terminals. The controller pack selectively electrically connects at least one of the plurality of terminals to the electrical power connection dependent upon information received by way of the communication link.

20 Claims, 3 Drawing Sheets

MODULAR POWER DISTRIBUTION SYSTEM

FIELD OF THE INVENTION

The present invention relates to a power distribution and control system for a vehicle, and, more particularly to a modularized linkable power distribution system for a vehicle system.

BACKGROUND OF THE INVENTION

In the 1980's expandable block assemblies were utilized to provide a flexible solution for power distribution. These assemblies did not have the intelligence demanded by advance features in today's vehicles. They also have drawbacks in reliability, diagnostics capability and manufacturability.

Mounted fuse and relay power distribution modules were used to overcome the reliability and manufacturing issues of the expandable block assemblies, but are limited in their flexibility as they are designed around a given vehicle to provide specific functionality. The printed circuit board base power distribution modules offer some optional mounting features to support the expandable block assemblies but diagnostic and intelligence logic is not available.

As body control I/O requirements have evolved, electronic control units are utilized that incorporate microprocessor logic with control features for the more advanced vehicle systems. Expansion requirements are provided in the electronic modules by either (1) designing modules that support the maximum content and then scaling back the different versions to provide lower cost for various models or (2) adding separate modules to support the required added features. For solution (1) there may be single module that supports all of the features, but the size and overall cost is large and is inflexible to change. For solution (2) each additional module requires additional mounting brackets and additional fuse battery feeds, which are material cost adders, manufacturing cost adders and require additional design engineering effort. The electronic power distribution modules are a custom design and are inflexible as requirements change and carry the burden of requiring a new product development program for each module and vehicle model.

Another approach is to use printed circuit board mounted fuse and relay power distribution modules in an electronic power distribution module package. Although the intent is to marry the benefits of the printed circuit board technology along with the body controllers, the result is still a custom design for any given electrical system or architecture, which is costly to change and difficult to adapt to the fast changing requirements of the electronics industry.

What is needed in the art is a flexible system that utilizes a standard distribution system.

SUMMARY OF THE INVENTION

The invention comprises, in one form thereof, a vehicle having a power and information system including a vehicle structural member, an insulated power conductor, a communication link and a modular distribution system. The modular distribution system is attached to the vehicle structural member. The modular distribution system is coupled with the power conductor and with the communication link. The modular distribution system includes a backbone module having an electrical power connection and at least one plug pack. Each plug pack includes a first connector, a second connector and a controller pack. The first connector is connectable to the backbone module. The second connector has a plurality of terminals. The controller pack selectively electrically connects at least one of the plurality of terminals to the electrical power connection dependent upon information received by way of the communication link.

The invention comprises, in another form thereof, a modular power and information distribution system for use on a vehicle, the system including a backbone module and at least one plug pack. The backbone module has an electrical power connection and a data communication connection. Each plug pack includes a first connector, a second connector and a controller pack. The first connector is connectable to the backbone module. The second connector has a plurality of terminals. The controller pack selectively electrically connects at least one of the plurality of terminals to the electrical power connection dependent upon information received by way of the data communication connection.

DETAILED DESCRIPTION OF THE INVENTION

Figure 1:
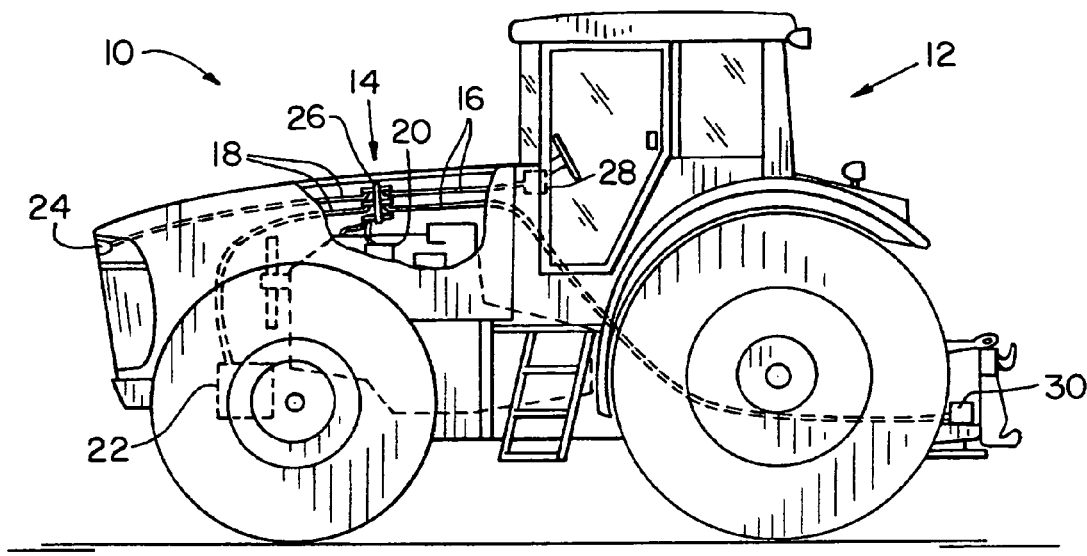
FIG. 1 illustrates a vehicle power distribution system for an agricultural vehicle including an embodiment of the modular power distribution system of the present invention.

Referring now to the drawings, and more particularly to FIG. 1, there is shown a vehicle power distribution system 10 including a vehicle 12 having modular power distribution system 14 installed thereon. Modular power distribution system 14 includes links 16, wiring harnesses 18, connected to sensors 20, actuator 22 and light 24. Modular power distribution system 14 supports a plug and play capability of the modules that are mounted thereto. Links 16 link various backbone assemblies 26 providing power, by way of an insulated power conductor, and communications thereto. Wiring harnesses 18 interface with backbone assembly 26 to interconnect with such things as sensors 20, actuator 22 and light 24. For example, a command can be sent to turn ON a light 24 which is then powered by way of backbone assembly 26. The command may have been received at backbone assembly 28, having been initiated by a switch or other input device actuated by an operator. The information received at backbone assembly 28 is digitized and placed upon link 16, which is then read by a plug pack in backbone assembly 26 and light 24 is turned ON. Information collected by sensors 20 is sent by backbone on assembly 26 is then placed upon link 16, which can provide information to a display panel connected to backbone assembly 28 or control a hydraulics function connected to backbone assembly 30. Each backbone assembly 30 is physically attached to a structural member of vehicle 12. The structural member includes any portion of vehicle 12 to which the backbone can be attached.

Each backbone assembly 26, 28 or 30 includes a backbone 32 and at least one plug pack 34. Backbone 32 includes a power connect 36, a fuse 38, a ground connect 40, a communication link 42 a wake-up link 44, a power connect 46 and a ground connect 48. Power arrives at backbone 32 and is provided at power connect 36. Fused power is provided through fuse 38 and may be utilized within backbone 32 and/or fused power may be passed on to subsequent backbones 32. Ground connect 40 provides a power return line for the power provided by way of power connect 36. Communication link 42 provides a network interface to plug packs 34 that are connected to backbone 32. Wake-up link 44 is utilized by a power management system to wake-up plug packs 34 that had gone into a shutdown mode due to a shutdown of the vehicle 12. Wake-up link 44 may also be used to put plug packs 34 in a power-down mode. Power connection 46 and ground connection 48 are supplied to plug packs 34. When multiple backbones 32 are required, fused power is provided through fuse 38 so that multiple backbones 32 may be daisy-chained together.

Figure 2:
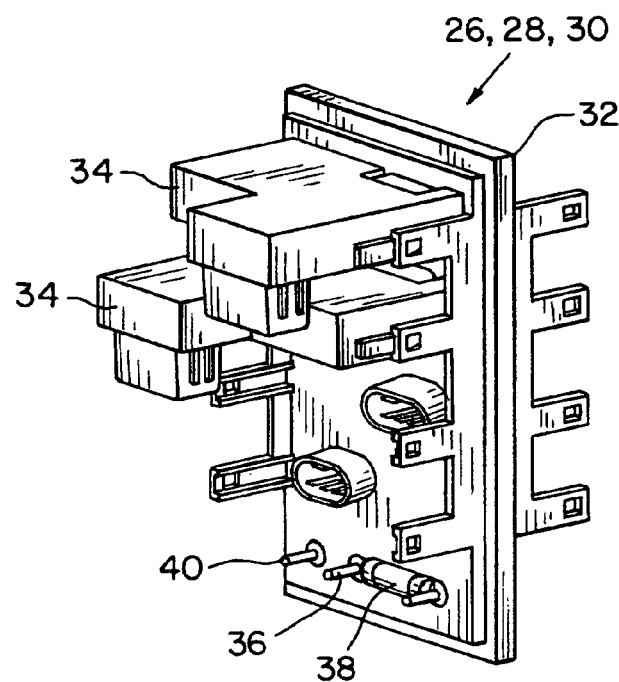
FIG. 2 illustrates a backbone and plug pack assembly of the modular power distribution system of FIG. 1.
Figure 3:
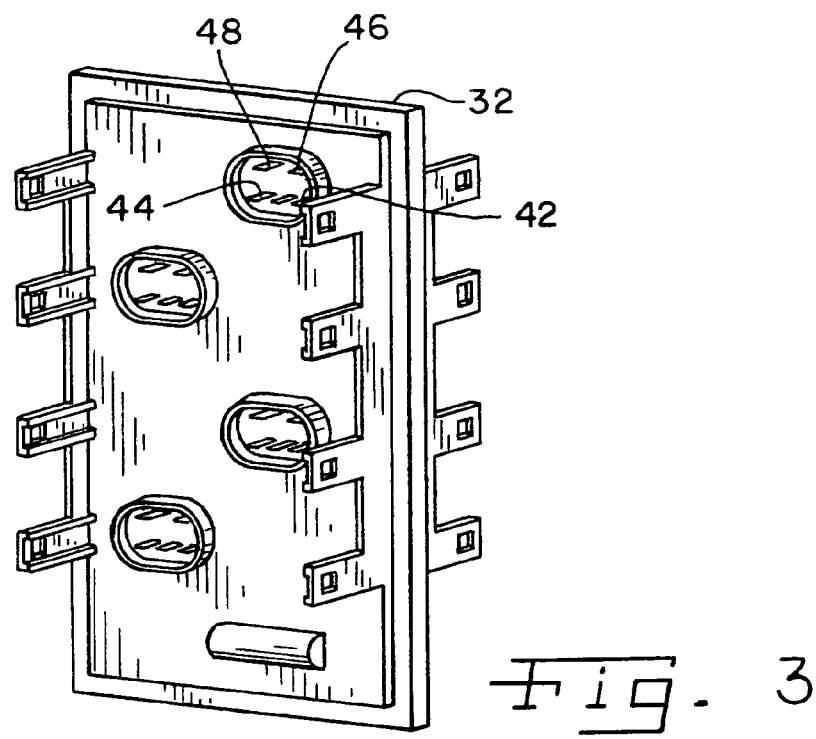
FIG. 3 is an illustration of the backbone of FIG. 2.
Figure 4:
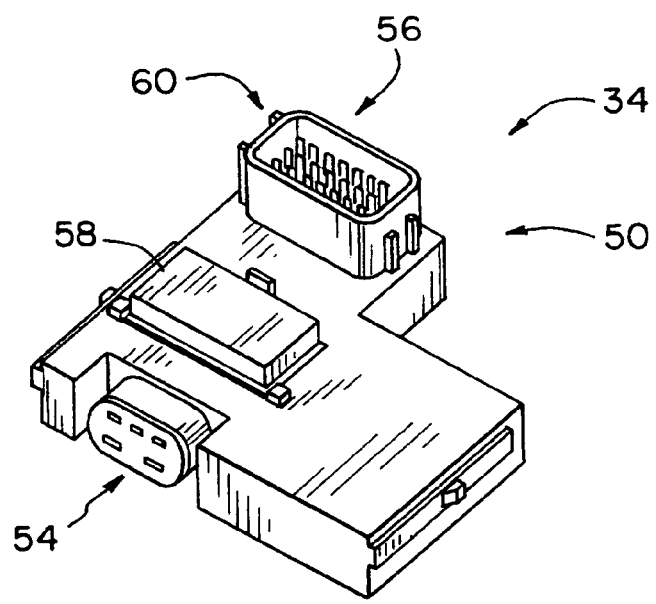
FIG. 4 illustrates a plug pack assembly of the modular power distribution system of FIGS. 1; and 2.
Figure 5:
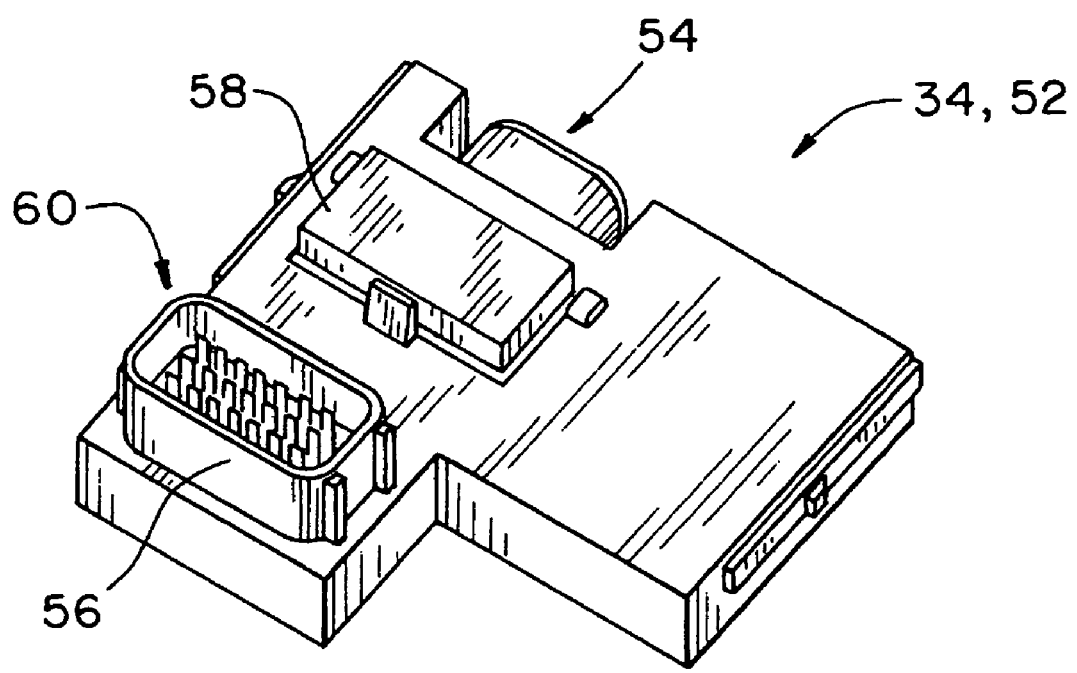
FIG. 5 illustrates another embodiment of the plug packs of FIGS. 1 and 2.

Plug packs 34 can come in various configurations, such as a standard left hand plug pack 50 and a right hand plug pack 52. Plug packs 50 and 52 are substantially mirror images of each other although the electrical connections therein are identical. The advantage of a left hand plug pack 50 and a right hand plug pack 52 is that the output connectors can be staggered over top of an adjacent plug pack 50 or 52 as illustrated in FIG. 2. Plug packs 50 and 52 will hereafter be referred to generically as plug packs 34 each having a connector 54 and a connector 56. Connector 54 interconnects with communication link 42, wake-up link 44, power 46 and ground 48. Connector 56 interfaces with wiring harness 18, which may have various power output and signal lines that connect to connector 56. Plug packs 34 additionally include a controller pack 58, which houses a system master controller that provides system logic for the specific requirements of the vehicular electrical system architecture.

A vehicle 12 may have various options yet the basic power distribution system 14 would include links 16 and backbones 32 positioned, for example, as shown as backbone assemblies 26, 28 and 30. Controller pack 58 operates as a plug and play system that receives information on links 16 and selectively provides power to terminals 60 in connector 56 to activate items such as light 24 or actuator 22. A sensor 20 provides information by way of connector 56, which is then processed by controller pack 58 with the information then provided onto link 16 for utilization by information systems of vehicle 12, not shown.

Plug packs 34 can be mounted into any position on backbone 32, since controller pack 58 provides the logic and specific requirements of the system architecture. Advantageously, each plug pack 34 is customized by the insertion of a controller pack 58 that has been programmed to provide certain functionality to plug pack 34. A common physical design of plug packs 34 provide for enhanced capabilities of a flexible system for the controlling of vehicle 12.

Plug packs 34 are modular having a standard mechanical and electrical interface relative to backbone 32. A particular strategy for defining the content of the plug packs is up to the system designer and specifically relates to the programming of controller pack 58. One approach may include partitioning the vehicle electrical system requirements into functional groups and empowering the plug packs for each feature or groups of features. The present invention is an expandable system allowing vehicles to be supported with a minimum number of plug packs in a single backbone thereby minimizing cost. As vehicle features are added the appropriate plug packs are connected to the backbone. Backbones can be added by installing a fuse, running a battery feed to the next backbone and adding the network interface from the controller pack. The benefits include a low cost on low end vehicles and yet still retain the capability of supporting all the features of a vehicle. Changes in requirements do not effect the overall system and only impact the plug pack associated with the individual feature or the given controller pack thereon. The present invention is easily expanded without impacting the overall system design and does not require extensive re-engineering. Further, the body electronics can be standardized so common plug packs can be used on different vehicles.

Having described the preferred embodiment, it will become apparent that various modifications can be made without departing from the scope of the invention as defined in the accompanying claims.

The invention claimed is:

1. A vehicle having a power and information system, comprising:
   a vehicle structural member;
   an insulated power conductor;
   a communication link;
   a modular distribution system attached to said vehicle structural member, said modular distribution system being coupled with said power conductor and with said communication link, said modular distribution system including:
      a backbone module having an electrical power connection; and
      at least one plug pack, each said plug pack including:
         a first connector connectable to said backbone module;
         a second connector having a plurality of terminals; and
         a controller pack that selectively electrically connects at least one of said plurality of terminals to said electrical power connection dependent upon information received by way of said communication link.

2. The vehicle power system of claim 1, wherein said controller pack receives at least one signal by way of at least one of said plurality of terminals, said signal includes information that is communicated on said communication link by said controller pack.

3. The vehicle power system of claim 2, further comprising:
   a ground conductor; and
   a ground connection in said modular distribution system, said ground connection electrically connected to said ground conductor.

4. The system of claim 1, wherein said backbone module includes a plurality of substantially similar connectors each of which being connectable to said first connector of said at least one plug pack.

5. The system of claim 4, wherein said controller pack is insertably connected to said plug pack.

6. The system of claim 5, wherein said at least one plug pack includes a first plug pack and a second plug pack that is substantially a mirror image of said first plug pack, said first plug pack and said second plug pack positioned in adjacent ones of said plurality of connectors of said backbone, said second connector of said first plug pack oriented to receive a connector adjacent to said second connector of said second plug pack.

7. The system of claim 5, wherein said at least one plug pack is a plurality of plug packs each being electrically identical except for said controller packs.

8. The system of claim 1, further comprising an other backbone module said electrical power connection and said data communication link being connectable to said other backbone module.

9. The system of claim 1, further comprising a power management control line connected to said backbone and communicatively coupled to said controller pack, said power management control line for at least one of supplying a wake-up command and a shut-down command.

10. The system of claim 1, wherein said backbone module includes a first side and a second side, a plurality of substantially similar connectors each of which are connectable to said first connector of said at least one plug pack being located on both said first side and said second side.

11. A modular power and information distribution system for use on a vehicle, the system comprising:
  a backbone module having an electrical power connection and a data communication connection; and
  at least one plug pack, each said plug pack including:
    a first connector connectable to said backbone module;
    a second connector having a plurality of terminals; and
    a controller pack that selectively electrically connects at least one of said plurality of terminals to said electrical power connection dependent upon information received by way of said data communication connection.

12. The system of claim 11, wherein said backbone module includes a plurality of substantially similar connectors each of which being connectable to said first connector of said at least one plug pack.

13. The system of claim 12, wherein said controller pack receives a signal delivered to at least one of said plurality of terminals, said controller pack transmitting information from the signal on said data communication connection.

14. The system of claim 13, wherein said controller pack is insertably connected to said plug pack.

15. The system of claim 14, wherein said at least one plug pack includes a first plug pack and a second plug pack that is substantially a mirror image of said first plug pack, said first plug pack and said second plug pack positioned in adjacent ones of said plurality of connectors of said backbone, said second connector of said first plug pack oriented to receive a connector adjacent to said second connector of said second plug pack.

16. The system of claim 14, wherein said at least one plug pack is a plurality of plug packs each being electrically identical except for said controller packs.

17. The system of claim 11, wherein said electrical power connection and said data communication connection of said backbone are daisy chainable to another backbone module.

18. The system of claim 11, further comprising a power management control line connected to said backbone and communicatively coupled to said controller pack, said power management control line for at least one of supplying a wake-up command and a shut-down command.

19. The system of claim 11, wherein said electrical power connection is isolated from any of said plurality of terminals except by way of said controller pack.

20. The system of claim 19, wherein said backbone module includes a first side and a second side, a plurality of substantially similar connectors each of which are connectable to said first connector of said at least one plug pack being located on both said first side and said second side.

* * * * *